United States Patent [19]

Shields

[11] 4,010,976
[45] Mar. 8, 1977

[54] MOTORCYCLE FAIRING

[76] Inventor: William D. Shields, R.R. 6 Lake Edgewood, Martinsville, Ind. 46151

[22] Filed: Feb. 13, 1976

[21] Appl. No.: 658,036

[52] U.S. Cl. .............................. 296/78.1; D12/182
[51] Int. Cl.² ........................................ B62J 17/02
[58] Field of Search ....................... 296/78.1, 84 R; 280/281, 289 R, 289 S; D12/182

[56] References Cited

UNITED STATES PATENTS

| 597,298 | 1/1898 | Ross | 296/78.1 |
| 3,154,342 | 10/1964 | Mueller | 296/78.1 |
| 3,690,721 | 9/1972 | Herbert | 296/78.1 |
| 3,787,088 | 1/1974 | Dreyer | 296/78.1 |

FOREIGN PATENTS OR APPLICATIONS

| 154,158 | 9/1938 | Austria | 296/78.1 |
| 979,320 | 12/1950 | France | 296/78.1 |
| 807,507 | 1/1959 | United Kingdom | 296/78.1 |
| 766,457 | 1/1957 | United Kingdom | 296/78.1 |

Primary Examiner—Richard J. Johnson
Attorney, Agent, or Firm—Woodard, Weikart, Emhardt & Naughton

[57] ABSTRACT

A motorcycle fairing is disclosed herein which comprises a one-piece, formed sheet of acrylic plastic having portions which extend in front of and above the motorcycle handlebars, and further including leg portions which extend downwardly along the opposite sides of the front fork of the motorcycle. The bottoms of the leg portions are shaped to direct air which confronts a moving motorcycle downwardly and toward the intake manifold of the motorcycle engine. The top of the fairing includes a lip which directs air upwardly and over the head of the motorcycle rider. The motorcycle fairing is attached to the handlebars with brackets. The fairing further includes a gasket which extends along the edge of the fairing and engages the front fork and lights of the motorcycle.

10 Claims, 5 Drawing Figures

MOTORCYCLE FAIRING

BACKGROUND OF THE INVENTION

1. Field of the Invention

This invention relates to the field of windshields and fairings for motorcycles.

2. Description of the Prior Art

A number of products have been designed to better protect the motorcycle rider from the myriad of problems and dangers which arise from motorcycle riding. A major concern involves the riders's comfort and safety with respect to articles which may strike the rider as he is moving. Articles carried by the air and items which may be thrown up from the street or from other vehicles could easily injure or otherwise interfere with the unprotected rider. Without some type of protective enclosure the rider is also more susceptible to rain and cold and also the tiring effect of fighting the flow of air which comes with riding at high speeds.

Motorcycle windshields have been in use for some time. They are desirable in that they are generally inexpensive, light-weight, and simple to install on the motorcycle. Windshields, however, provide only very minimal protection to the motorcycle rider. The windshields particularly fail to afford protection for the rider's hands, arms and legs.

Motorcycle fairings provide increased protection for the motorcycle rider, and generally are of two types. Fairings which are mounted on the handlebars comprise formed windshields attached to a fiberglass base, the fairing being mounted upon the handlebars with brackets. This type of fairing still fails to provide good body protection for the rider, and is generally unstable and will vibrate at highway speeds. Frame-mounted fairings afford the motorocycle rider the maximum amount of body protection. These "full" fairings, however, are expensive, heavy, and detract from the aesthetic appearance of the motorcycle. They also require much time and effort for installation on the motorcycle, and the stability and vibration resistance of the full fairings should be improved.

SUMMARY OF THE INVENTION

A motorcycle fairing is described herein which comprises a formed sheet of transparent material, the formed sheet including first portions extending across and spaced apart from the front of the motorcycle handlebars, a second portion extending above the handlebars to shield the motorcycle rider's face, and third portions extending downwardly along opposite sides of the front fork of the motorcycle.

It is an object of the present invention to provide a motorcycle fairing which affords full protection to the motorcycle rider.

A further object of the present invention is to provide a motorcycle fairing which forms a tight, wind-resistant seal around the front of the motorcycle.

Another object of the present invention is to provide a motorcycle fairing which is aesthetically pleasing.

Yet another object of the present invention is to provide a motorcycle fairing which is easily installed on a motorcycle, and which vibrates a minimum amount.

Further objects and advantages of the present invention will become apparent from the figures and description which follow.

DESCRIPTION OF THE PREFERRED EMBODIMENT

Figure 1:
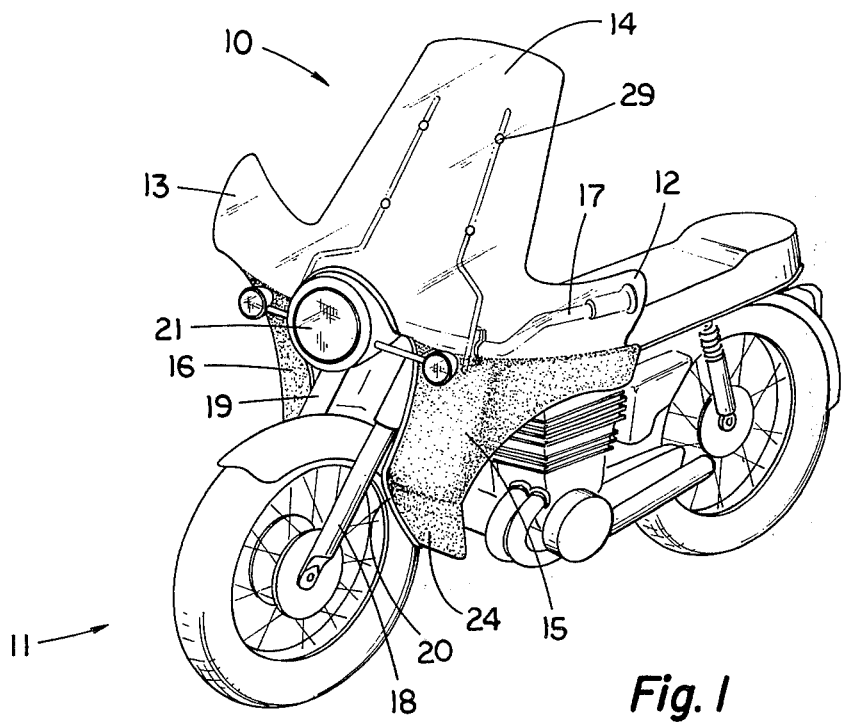
FIG. 1 is a perspective view of the motorcycle fairing of the present invention mounted upon a motorcycle.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
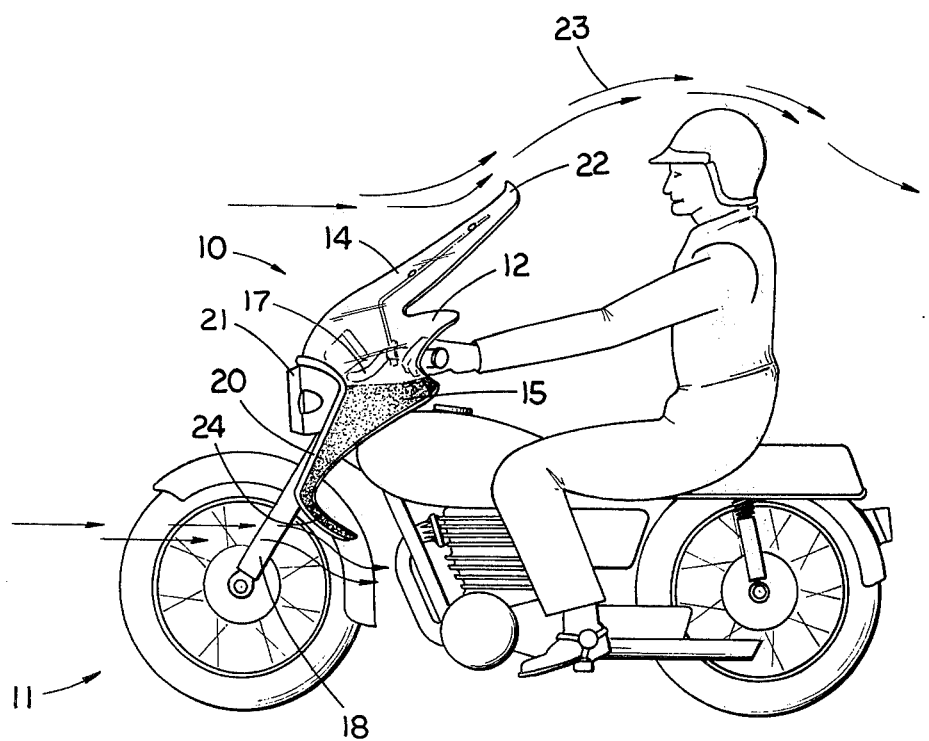
FIG. 2 is a left side view of the fairing and motorcycle of FIG. 1, also showing a rider positioned on the motorcycle.
Figure 3:
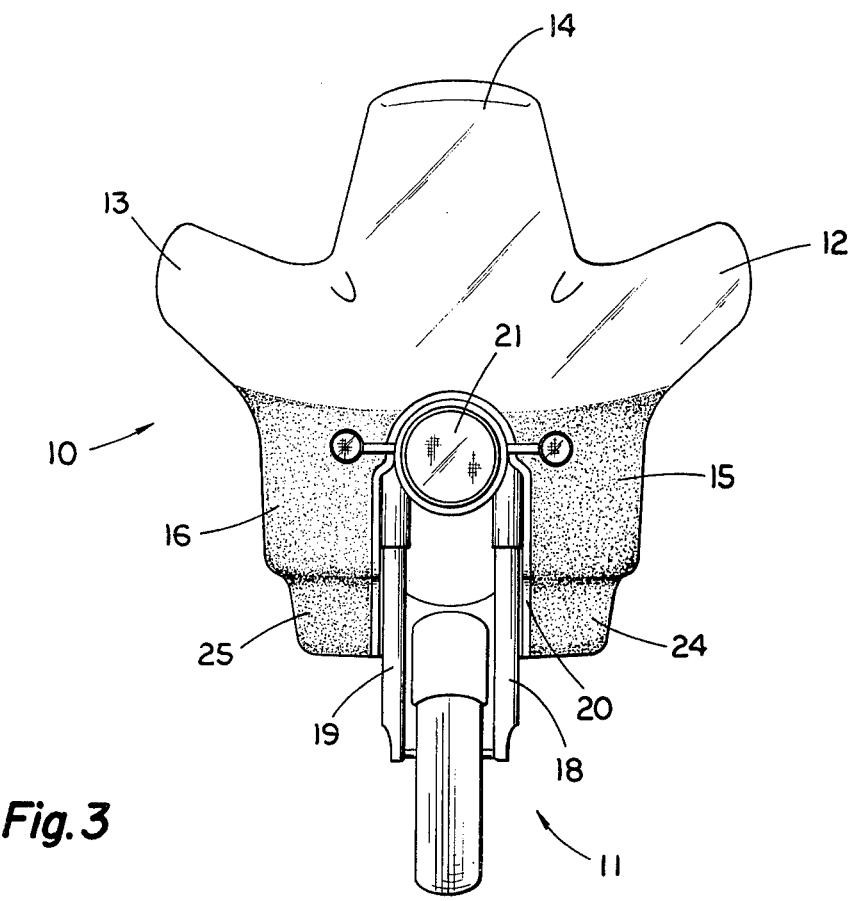
FIG. 3 is a front view of the fairing and motorcycle of FIG. 1.

Referring now to FIGS. 1–3, there is shown a motorcycle fairing 10 according to the present invention. The fairing 10 is shown mounted upon a motorcycle 11 and includes first portions 12 and 13, second portion 14, and third portions 15 and 16. First portions 12 and 13 extend across and are spaced apart from the front of the motorcycle handlebars 17. Second portion 14 extends above the handlebars 17 and third portions 15 and 16 extend downwardly along opposite sides of the front fork members 18 and 19, respectively.

Figure 5:
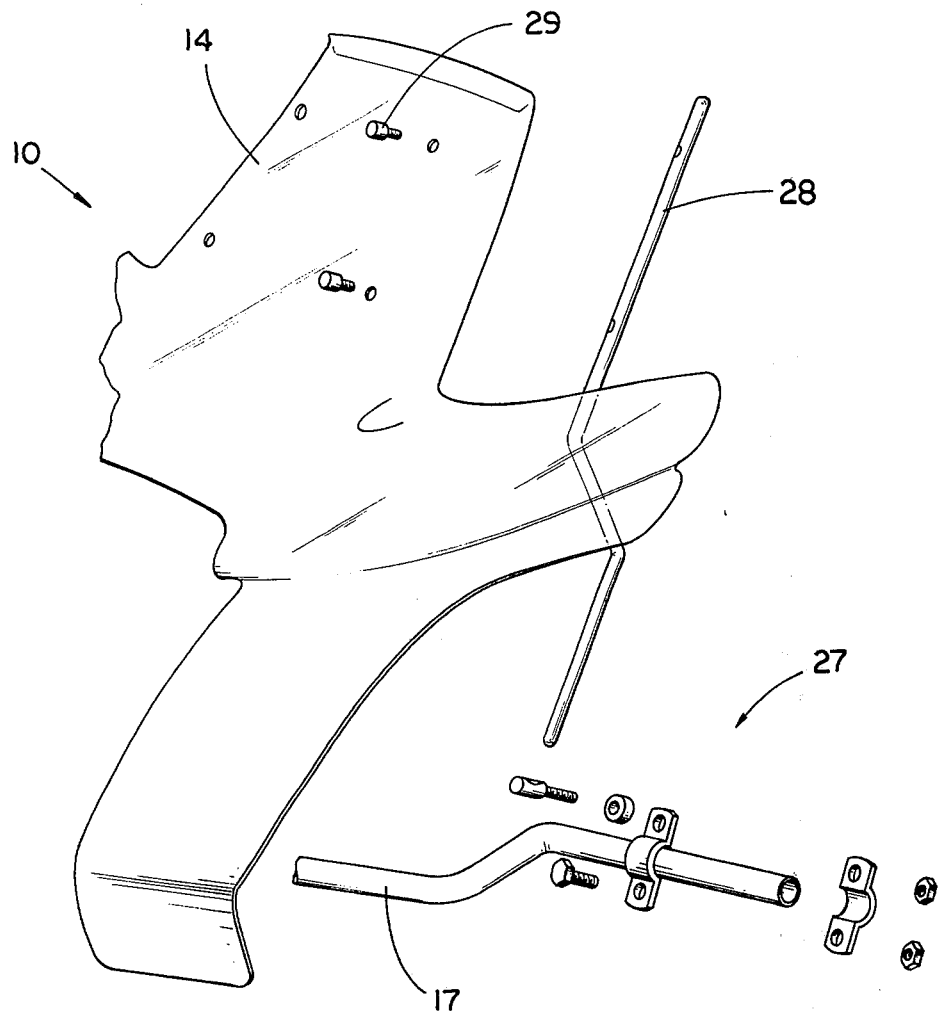
FIG. 5 is an exploded view of the fairing of the present invention, showing the bracket assembly used to attach the fairing to the motorcycle handlebars.

Second portion 14 is attached to the handlebars 17 by brackets, as is more clearly shown in FIG. 5. The motorcycle fairing 10 further includes a gasket 20 which extends along third portions 15 and 16. The gasket comprises a flexible, resilient material which may be deformed against the adjacent parts of the motorcycle to form a tight friction fit. To install the fairing 10 onto a motorcycle, the third portions 15 and 16 are flexed apart from each other, and the fairing is lowered onto the front portion of the motorcycle. With the fairing in the proper position, the third portions are allowed to spring back to their normal position and gasket 20 is thereby deformed against and tightly fits with the adjacent portions of the motorcycle. The fairings and gasket are preferably designed to have the gasket frictionally engage the headlight assembly 21 and the front fork members 18 and 19. This will increase the effectiveness of the gasket in holding the fairing to the motorcycle and in reducing the vibrations of the fairing.

The fairing 10 may be formed from any hard, transparent material. The shape of the fairing is most conveniently achieved by molding a sheet of plastic material. It has been found that 3/16 inch Lucite AR, a product of the Dupont Company of Wilmington, Delaware, is well suited to be used as the fairing material. Lucite AR has good abrasion and impact resistance, high strength and hardness, is light weight, and cleans and weathers well. In addition, the material is easily formed and fabricated.

The exact shape of the fairing is, of course, alterable to suit the dimensions of the motorcycle. The size and contour of the various portions of the fairing may also be varied according to the tastes of the particular manufacturer. It is preferable, however, that the third portions of the fairing be shaped to have the gasket 20 engage the headlight assembly 21 and the front fork members 18 and 19 in order to maximize the stability and air tightness of the fairing. As shown in FIG. 2, the second portion 14 preferably includes a lip 22 or similar shape to direct the flow of air 23 above the head of the motorcycle rider. The bottoms 24 and 25 of third portions 15 and 16 are preferably shaped to direct air downwardly away from the rider's legs and feet. More preferably, the bottoms 24 and 25 should, if the design of the motorcycle permits, deflect the air downwardly toward the intake manifold of the motorcycle engine. This will promote efficiency of the motorcycle engine while also accomplishing the desired effect of protecting the rider's legs and feet from objects which may be thrown up from the street or carried in the air.

As seen generally in FIGS. 1–3, the motorcycle fairing of the present invention provides a substantial shield of protection for the motorcycle rider. The air encountered by the moving motorcycle is deflected to the top, bottom and both sides of the motorcycle and the rider. The hard plastic fairing provides protection against objects which would otherwise strike the rider, but does not interfere with the rider's view of the road. The one-piece construction of the fairing makes it easy to install and also reduces the amount of vibration. In addition, the gasket operates to absorb the vibrations of the motorcycle and reduces the transmission of those vibrations to the fairing. As indicated in FIGS. 2 and 3, the third portions 15 and 16 of the motorcycle fairing could also be colored or painted to improve the aesthetic appearance of the fairing. This coloring could be accomplished either during the process of manufacturing the fairing, or the backs of the third portions could be painted at a later time.

Figure 4:
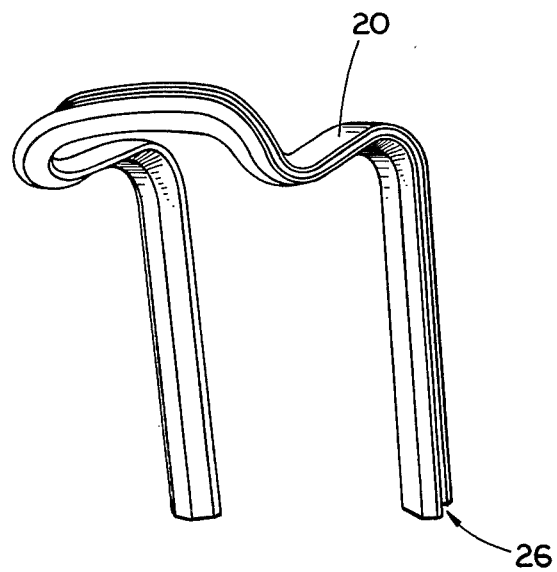
FIG. 4 is a perspective view of the gasket utilized by the fairing of the present invention.

Depicted in FIG. 4 is the gasket 20 of the present invention. As noted previously, the gasket should comprise a flexible and resilient material to permit the third portions of the fairing to compress the gasket against the adjacent portions of the motorcycle. The gasket preferably comprises a foamed material which is resistant to deterioration due to weather and gasoline. Vinyl, urethane or rubber foam has been found to be appropriate. The material may be molded or extruded to form the required shape. The gasket includes a groove 26 which receives the edges of the third portions of the fairing and is secured thereto either frictionally or with an adhesive. To install the fairing, the gasket is fitted onto the third portions and the fairing is lowered onto the front of the motorcycle as previously described. The gasket should be of sufficient size to permit substantial compression of the material between the third portions and the motorcycle. This will insure that the junction between the fairing and the motorcycle will permit a minimum amount of air and materials to flow between them, and will maximize the firmness of the attachment of the fairing to the motorcycle.

As shown in FIG. 5, the motorcycle fairing includes identical bracket assemblies such as 27 for attaching the fairing 10 to the motorcycle handlebars 17. Bracket assembly 27 is essentially the same as the bracket assemblies which are commonly employed for attaching fairings or windshields to motorcycles. The top of rod 28 is attached to the second portion 14 of the motorcycle fairing with bolts such as 29 which pass through aligned apertures in the two elements. The bottom of rod 28 is attached to the handlebars 17 by bracket assembly 27 as is well known.

While there have been described above the principles of this invention in connection with specific apparatus, it is to be clearly understood that this description is made only by way of example and not as a limitation in the scope of the invention.

What is claimed is:

1. A motorcycle fairing which comprises:
   a formed sheet of transparent material, the formed sheet including first portions extending across and spaced apart from the front of the motorcycle handlebars, a second portion extending above the handlebars to shield the motorcycle rider's face, and third portions extending downwardly along opposite sides of the front fork of the motorcycle; and
   connecting means for attaching the third portions to the front fork of a motorcycle, said connecting means comprising a gasket extending along the third portions, the gasket comprising a flexible, resilient material, the third portions being spaced apart a distance sufficient to cause the gasket to be deformed against the front fork of the motorcycle and to frictionally engage the front fork.

2. The motorcycle fairing of claim 1 in which the bottom of the third portions is shaped to direct air toward the motorcycle engine.

3. The motorcycle fairing of claim 1 in which the backs of the third portions are painted.

4. The motorcycle fairing of claim 1 in which the gasket further includes a portion which engages the motorcycle lights.

5. The motorcycle fairing of claim 4 in which the bottom of the third portions is bent at an obtuse angle with the back of the motorcycle fairing to deflect air downwardly.

6. The motorcycle fairing of claim 5 in which the bottom of the third portions is shaped to direct air toward the manifold of the motorcycle engine.

7. The motorcycle fairing of claim 6 in which the top of the second portion is shaped to direct air upwardly.

8. The motorcycle fairing of claim 7 which further comprises mounting means for connecting the fairing to the handlebars of a motorcycle.

9. The motorcycle fairing of claim 8 in which the mounting means includes a pair of brackets which are attached to the second portion and are operable to be attached to the handlebars of the motorcycle.

10. The motorcycle fairing of claim 9 in which the backs of the third portions are painted.

* * * * *